United States Patent

Liu et al.

Patent Number: 5,957,411
Date of Patent: Sep. 28, 1999

[54] METHOD USING DOUBLE THRUSTER FIRINGS TO DEADBEAT FLEXIBLE SOLAR ARRAY STRUCTURAL OSCILLATIONS

[75] Inventors: Tung Y Liu, Union City; Kam K Chan, San Jose, both of Calif.

[73] Assignee: Space Systems/Loral, Inc., Palo Alto, Calif.

[21] Appl. No.: 08/998,173

[22] Filed: Dec. 24, 1997

Related U.S. Application Data

[60] Provisional application No. 60/036,768, Jan. 31, 1997.

[51] Int. Cl.[6] ....................................................... B64G 1/26
[52] U.S. Cl. ........................... 244/169; 244/164; 244/172; 244/173
[58] Field of Search ................................. 244/158 R, 164, 244/169, 172, 173

[56] References Cited

U.S. PATENT DOCUMENTS

| | | |
|---|---|---|
| 4,084,772 | 4/1978 | Muhfelder . |
| 4,489,383 | 12/1984 | Schmidt, Jr. . |
| 4,521,855 | 6/1985 | Lehner et al. . |
| 4,585,191 | 4/1986 | Blount . |
| 4,599,697 | 7/1986 | Chan et al. . |
| 4,759,517 | 7/1988 | Clark . |
| 4,767,084 | 8/1988 | Chan et al. ............................. 244/164 |
| 4,848,706 | 7/1989 | Garg et al. . |
| 4,931,942 | 6/1990 | Garg et al. . |
| 5,184,790 | 2/1993 | Fowell . |
| 5,222,023 | 6/1993 | Liu et al. . |
| 5,257,802 | 11/1993 | Hablani . |
| 5,305,971 | 4/1994 | Decanini ................................. 244/173 |
| 5,349,532 | 9/1994 | Tilley et al. . |
| 5,400,252 | 3/1995 | Kazimi et al. . |
| 5,443,231 | 8/1995 | Anzel ...................................... 244/164 |
| 5,459,669 | 10/1995 | Adsit et al. . |
| 5,540,405 | 7/1996 | Bender et al. ......................... 244/164 |
| 5,806,804 | 9/1998 | Goodzeit et al. ...................... 244/169 |
| 5,810,295 | 9/1998 | Anzel ...................................... 244/169 |

FOREIGN PATENT DOCUMENTS

| | | |
|---|---|---|
| 0 499 815 A1 | 8/1992 | European Pat. Off. . |
| 0 563 719 A2 | 10/1993 | European Pat. Off. . |
| 0 607 239 6 | 3/1994 | European Pat. Off. . |
| 1 468 913 | 4/1967 | France . |

OTHER PUBLICATIONS

Hablani, Hari B., "Self–Balanced Modal Control for Spacecraft Using Thrusters and Adaptive Bandpass Filters", Journal of Guidance, Control and Dynamics, vol. 15, No. 3, May 1992, pp. 587–596.

"Attitude Stabilization of Flexible Spacecraft During Stationkeeping Maneuvers", Bong Wie et al., J. Guidance, vol. 7, No. 4, Jul.–Aug. 1984, pp. 430–436.

*Primary Examiner*—Charles T. Jordan
*Assistant Examiner*—Charles R. Ducker, Jr.
*Attorney, Agent, or Firm*—Perman & Green, LLP

[57] ABSTRACT

A spacecraft includes a plurality of thrusters mounted at predetermined locations on a spacecraft structure, individual ones the plurality of thrusters being fired for generating a torque about a desired axis. The firing of a thruster is partitioned into two firings that are offset in time by an amount $\Delta t$, wherein $\Delta t=(\frac{1}{2})\times(1/F)\times SF$, where F is a dominant modal frequency, in Hertz, for any particular axis (nominally the 1st mode) of the spacecraft structure, and where SF is a scale factor that is adjustable about the frequency. In a presently preferred embodiment the thruster is a low thrust thruster that is mounted on a solar array panel, and the thrusters are fired in pairs.

9 Claims, 8 Drawing Sheets

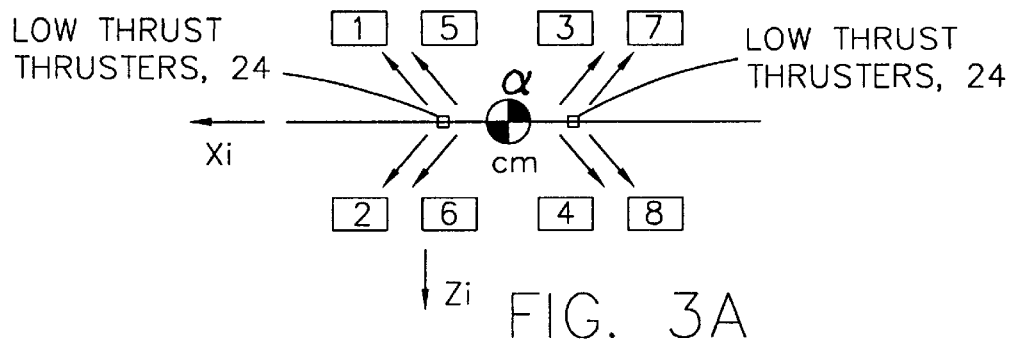
FIG. 3A
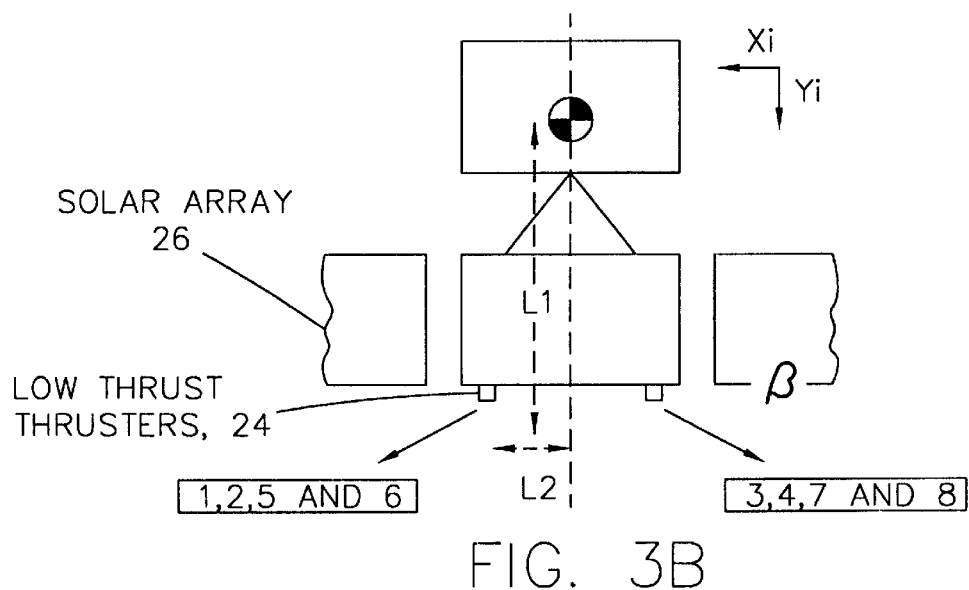
FIG. 3B
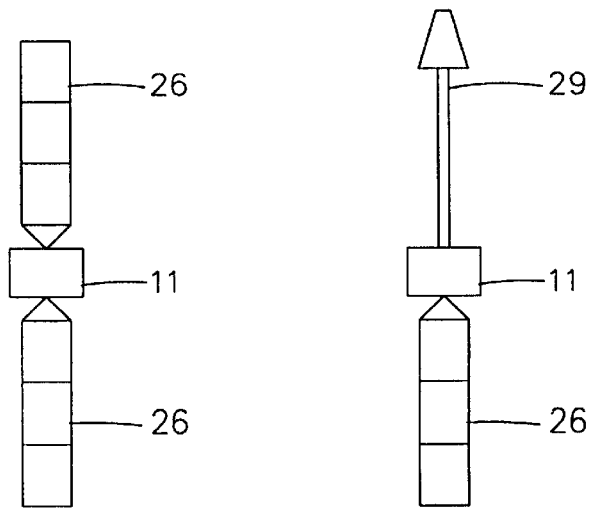
FIG. 5A
(PRIOR ART)
FIG. 5B
(PRIOR ART)

METHOD USING DOUBLE THRUSTER FIRINGS TO DEADBEAT FLEXIBLE SOLAR ARRAY STRUCTURAL OSCILLATIONS

CLAIM OF PRIORITY FROM COPENDING PROVISIONAL APPLICATION

This patent application claims priority under 35 U.S.C. §1.119 (e) from copending Provisional Patent Application No. 60/036,768, filed Jan. 31, 1997, entitled "Method Using Double Thruster Firings to Deadbeat Flexible Solar Array Structural Oscillations", by Tung Y. Liu et al., the disclosure of which is incorporated by reference herein in its entirety.

FIELD OF THE INVENTION

This invention relates generally to spacecraft attitude control systems and, in particular, to three axis stabilized spacecraft.

BACKGROUND OF THE INVENTION

Spacecraft perform various maneuvers after they are launched into space and once they are on-station in an intended orbit. For example, after a spacecraft is launched into a low orbit, it may be required to raise the spacecraft to a higher (e.g., geosynchronous) orbit by firing the spacecraft's main thruster. This type of maneuver is known as an orbit-raising maneuver. Also by example, after the spacecraft is on-station in a selected orbit, various forces (e.g., solar and/or other environmental disturbance torques, such as magnetic torques) may act on the spacecraft and cause the spacecraft to drift away from its selected orbit into another, incorrect orbit. Thus, periodic (e.g., daily, weekly, or monthly) orbital maneuvers are often required to return the spacecraft to the correct orbit. These types of maneuvers are known as station-keeping maneuvers.

During the performance of each type of maneuver, the precise control of the spacecraft's attitude to orient the spacecraft's payload, such as communication or imaging hardware, to a preselected planetary location and/or to correctly orient the spacecraft's thrust vector is essential. Thus, spacecraft are typically equipped with closed-loop control systems which enable the attitude of the spacecraft to be controlled within pre-established deadband limits. Such control systems often employ spacecraft thrusters for selectively producing torques on the spacecraft for correcting the spacecraft attitude. By example, during orbit-raising maneuvers, attitude control can be maintained by activating selected ones of the spacecraft's thrusters to create a desired torque in order to correct the spacecraft's attitude.

The following commonly assigned U.S. Patents are illustrative of various approaches to providing spacecraft attitude control: U.S. Pat. No. 5,459,669, Control System And Method For Spacecraft Attitude Control, to Adsit et al.; U.S. Pat. No. 5,400,252, Spacecraft East/West Orbit Control During A North Or South Stationkeeping Maneuver, to Kazimi et al.; U.S. Pat. No. 5,349,532, Spacecraft Attitude Control And Momentum Unloading Using Gimballed And Throttled Thrusters, to Tilley et al.; and U.S. Pat. No. 5,222,023, Compensated Transition For Spacecraft Attitude Control, to Liu et al.

Reference can also be had to U.S. Pat. No. 5,184,790, Two-Axis Attitude Correction For Orbit Inclination, to Fowell; U.S. Pat. No. 4,931,942, Transition Control System For Spacecraft Attitude Control, to Garg et al.; U.S. Pat. No. 4,848,706, Spacecraft Attitude Control Using Coupled Thrusters, Garg et al.; U.S. Pat. No. 4,767,084, Autonomous Stationkeeping For Three-Axis Stabilized Spacecraft, to Chan et al.; U.S. Pat. No. 4,759,517, Station-Keeping Using Solar Sailing, to Clark; U.S. Pat. No. 4,599,697, Digital PWPF Three Axis Spacecraft Attitude Control, to Chan et al.; U.S. Pat. No. 4,521,855, Electronic On-Orbit Roll/Yaw Satellite Control, to Lehner et al.; U.S. Pat. No. 4,489,383, Closed-Loop Magnetic Roll/Yaw Control System For High Inclination Orbit Satellites, to Schmidt, Jr.; and U.S. Pat. No. 4,084,772, Roll/Yaw Body Steering For Momentum Biased Spacecraft, to Muhlfelder.

Reference is also made to a publication entitled "Attitude Stabilization of Flexible Spacecraft During Stationkeeping Maneuvers", Bong Wie et al., J. Guidance, Vol. 7, No. 4, pgs. 430–436, Jul.–Aug. 1984.

Reference can also be had to European Patent Application No.: 0499 815 A1, Triaxially Stabilized Satellite Provided with Electric Propulsors for Orbital Maneuvering and Attitude Control, to Mazzini.

A typical geosynchronous satellite is designed to minimize solar torque imbalance. This is typically accomplished with symmetric solar array design, with the solar arrays 26 being located on the north and south side of the spacecraft (FIG. 5A), or in a configuration with the solar arrays 26 on the south side, balanced by a solar sail 29 on the north side (FIG. 5B). These appendages extend from a spacecraft bus 11. Residual solar and environmental disturbance torques are stored in momentum wheels that are then unloaded periodically using high thrust thrusters, magnetic torquers, trim tabs, or solar panel angle adjustments.

It can be appreciated that the inclusion of conventional momentum wheels and wheel unloading devices will typically increase the mass, complexity and cost of the spacecraft.

Furthermore, conventional approaches to reducing spacecraft structural excitations include adding active or passive damping devices and/or providing stiffening members to the spacecraft structural members. However, this approach increases the spacecraft mass and also the non-recurring costs.

Furthermore, if additional hardware damping devices are used, the devices are typically custom designed for a particular application, and are tuned to a single pre-flight modal frequency. However, variations in the primary modal frequency may occur during the operational life of the spacecraft, thereby rendering the damping devices less effective.

OBJECTS AND ADVANTAGES OF THE INVENTION

It is a first object and advantage of this invention to provide a three axis stabilized spacecraft that uses pairs of low thrust (i.e., a fraction of a Newton-meter) thrusters to achieve at least one of (a) a removal of a disturbance torque, or (b) fine pointing attitude control, while also providing a technique to suppress structural oscillations.

It is a second object and advantage of this invention to provide a three axis stabilized spacecraft that uses pairs of pulse plasma thrusters that are disposed on one or more spacecraft appendages, for example at the ends of a solar array panel, to achieve at least one of (a) a removal of the disturbance torque, or (b) fine pointing attitude control, while also providing a technique to suppress structural oscillations of the appendage(s).

It is another object and advantage of this invention to provide a three axis stabilized spacecraft that uses pairs of low thrust thrusters to damp structural oscillations, thereby simplifying the design of a spacecraft and eliminating or reducing a requirement for conventional hardware dampening devices.

SUMMARY OF THE INVENTION

The foregoing and other problems are overcome and the objects and advantages of this invention are realized by a spacecraft that includes a plurality of low thrust thrusters mounted at predetermined locations on a spacecraft structure. The plurality of low thrust thrusters are fired in pairs for generating a desired torque, where the firing of a low thrust thruster pair is partitioned into two firings that are offset in time by an amount $\Delta t$, where $\Delta t=(\frac{1}{2})\times(1/F)\times SF$, and where F is a dominant modal frequency, in Hertz, for any particular axis (nominally the 1st mode) of the spacecraft structure, and where SF is a scale factor that is adjustable about the nominal frequency. In a preferred embodiment the low thrust thrusters are mounted on a solar array panel, and are controllably fired so as to suppress oscillations in the solar array panel.

In a presently preferred embodiment of this invention the spacecraft is a geosynchronous spacecraft comprising a first set of four low thrust thrusters and a second set of four, redundant, low thrust thrusters. The first and second sets of low thrust thrusters are mounted in a predetermined configuration on a spacecraft structure. The plurality of low thrust thrusters are fired in pairs for generating a desired torque, and the firing of a low thrust thruster pair is partitioned into two firings that are offset in time by the amount $\Delta t$.

Further in accordance with a presently preferred embodiment, the geosynchronous spacecraft includes an imager payload, and is useful in obtaining meteorological images of the Earth.

BRIEF DESCRIPTION OF THE DRAWINGS

The features of the invention are made more apparent in the ensuing Detailed Description of the Invention when read in conjunction with the attached Drawings, wherein:

FIGS. 3A and 3B illustrate a first low thrust thruster configuration in accordance with this invention;

FIGS. 5A and 5B illustrate conventional solar array placements for a geosynchronous satellite;

DETAILED DESCRIPTION OF THE INVENTION

The teaching of this invention pertains, but is not limited to, the removal of solar and/or other environmental disturbance torques using low thrust thrusters, and also fine on-orbit pointing of a spacecraft using low thrust thrusters. In particular, the teaching of this invention pertains to reducing solar array panel mechanical excitations due to the firing of pairs of low thrust thrusters that are mounted on the solar array panel. Before describing in detail the teachings of this invention, a discussion will first be made of the use of low thrust thrusters to remove solar and other torques, and also to enable fine, on-orbit spacecraft pointing.

Figure 1:
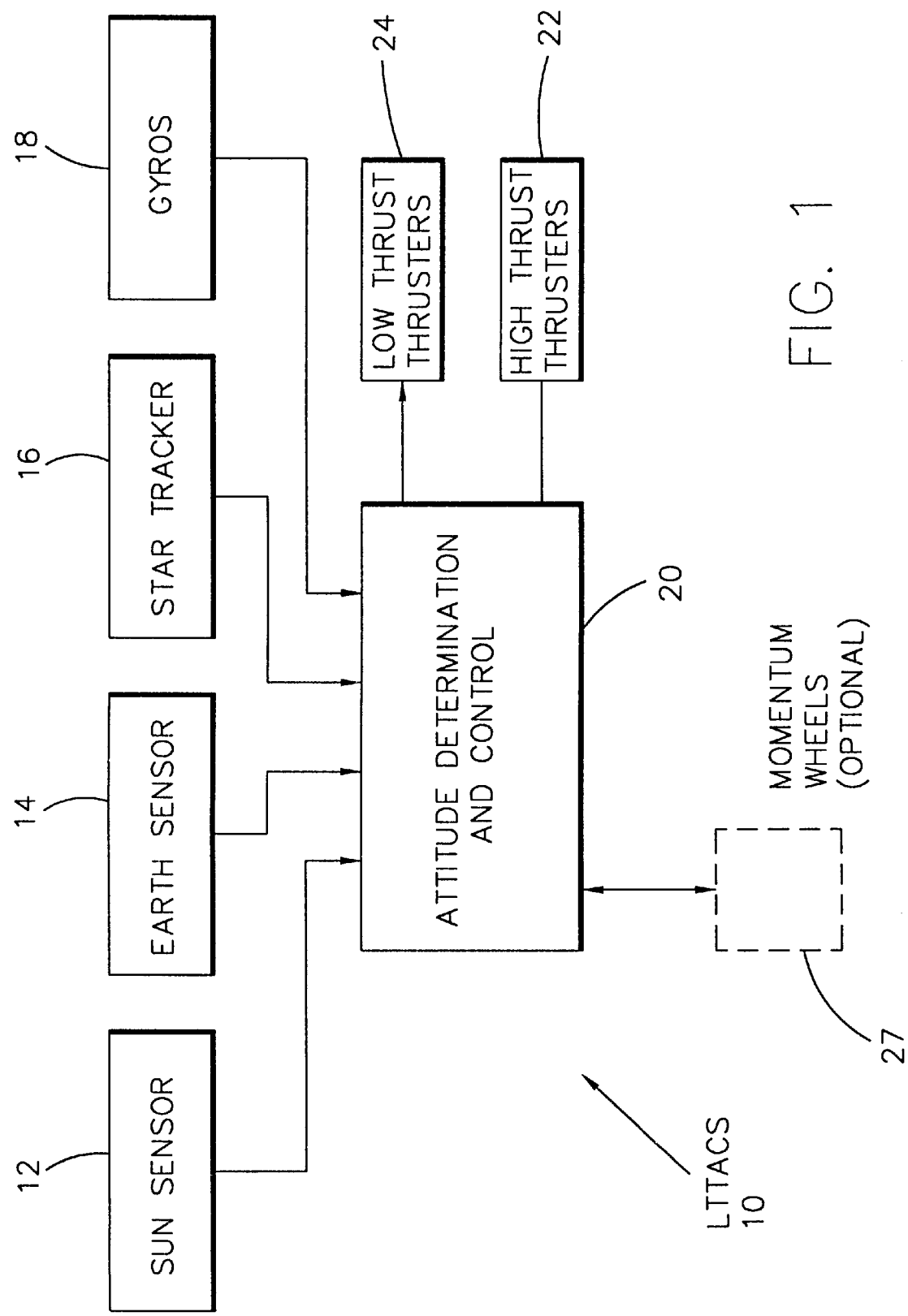
FIG. 1 is a block diagram of a spacecraft attitude determination and control system suitable for practicing this invention.

Referring to FIG. 1, the Low Thrust Thruster Attitude Control System (LTTACS) 10 includes an attitude determination and control system 20 that uses sensor inputs (e.g., from one or a combination of a sun sensor 12, an earth sensor 14, and a star tracker 16 ), in combination with an inertial sensor system (gyros 18 ), for thruster command generation. The spacecraft includes one or more high thrust thrusters 22 and a plurality of low thrust thrusters 24. By example, the high thrust thrusters 22 may be 22 Newton-meter thrusters, while the low thrust thrusters 24 may be 400 $\mu$N-meter thrusters (such as pulse plasma thrusters). In general, the maximum thrust output of the low thrust thrusters 24 is a fraction of one Newton-meter. The LTTACS 10 also provides a mechanism to transition from the high thrust thruster 22 used for $\Delta V$ to the low thrust thrusters 24 used for fine attitude control.

Any residual momentum can be absorbed by the low thrust thrusters 24 during transition from the high to the low thrust thrusters, either alone or in combination with optional momentum wheels 27. If the optional momentum wheels 27 are provided on the spacecraft, the low thrust thrusters 24 can be used to augment the operation of the momentum wheels 27, and/or to act as a back-up system in the case of the failure of a momentum wheel.

Unlike conventional thruster control systems that can only control thrusters mounted on the spacecraft body 11, the LTTACS 10 may also command low thrust thrusters 24 mounted on spacecraft appendages, such as solar array panel(s) 26 (FIGS. 2A, 2B and 2D), for maintaining attitude control. The LTTACS 10 uses the low thrust thrusters 24 to provide roll, pitch and yaw control torques to directly remove solar and other torque disturbances, and to control the spacecraft attitude to on-orbit pointing requirements.

Locating the low thrust thrusters 24 on the solar array panel 26 is beneficial in that it increases the moment arm about which the thrusters act. By example, thrusters located on the spacecraft bus may have a moment arm of about one meter, while thrusters located at the extremities of the solar array panel 26 can have a moment arm that is an order of magnitude larger. This is an important consideration, in that the operational lifetime of the low thrust thruster 24 may be limited, and the increased benefit in torque provided by the longer moment arm reduces the required firing time of the low thrust thrusters in order to achieve a given amount of correcting torque.

The placement of the low thrust thrusters 24 on the solar array panel(s) 26 also provides the benefit that the low thrust thrusters 26 can be aligned with the solar torque disturbance coordinate frame that acts on the solar arrays, thereby functioning to directly counter the solar torque (which acts as an inertial torque).

The LTTACS 10 generates high precision attitude knowledge from any one of the following three sensor combinations: (1) gyros 18 and star tracker 16, (2) gyros 18, star tracker 16 and earth sensor 14, or (3) gyros 18, earth sensor 14 and sun sensor 12. The low thrust thrusters 24 are then commanded to achieve fine on-orbit attitude control suitable for, by example, accurately pointing an imager payload or a communications payload for a 3-axis stabilized meteorological or communication satellite, respectively.

In greater detail, and referring to the Low Thrust Thruster Attitude Control System (LTTACS) 10 block diagram shown in FIG. 1, the on-board attitude determination and control system 20 uses the gyros 18 in combination with either: (1) the star tracker(s) 16, (2) the earth sensor(s) 14 and star tracker(s) 16, or (3) the earth sensor(s) 14 and sun sensor(s) 12 to provide low noise attitude measurement, thruster control logic to generate thruster on-time commands, and the low thrust thrusters 24 for torque output. The output of the high thrust thrusters 22 is controlled for orbit raising and ΔV maneuvers, while the outputs of the low thrust thrusters 24 are controlled for transition and normal on-orbit operations. The earth sensor(s) 14, sun sensor(s) 12, and gyros 18 can be used during orbit raising operations. As was stated previously, the momentum wheels 27 can be provided if desired.

The combination of: (1) star tracker 16, or (2) star tracker 16 and earth sensor 14, or (3) earth sensor 14 and sun sensor 12, is used to provide the spacecraft's reference roll, pitch and yaw attitude. This data is used by an on-board filter of the attitude determination and control system 20 to determine and remove drift in the gyros 18. The selected reference sensor(s) provide accurate long term spacecraft attitude knowledge, while the gyros 18 improve short term attitude knowledge. The reference sensors 12–16 and calibrated gyro 18 form an attitude determination system that can be described by the use of standard quaternion parameters [q1, q2, q3 and q4].

In order to generate torque commands, the desired trajectory for nadir pointing in terms of quaternion parameters is convolved by the controller 20 with propagated quaternions. The first three error quaternion [q1, q2, q3] and body rate [w1, w2, and w3] states are then multiplied by controller gains to generate thruster commands. The required torque is converted to an on-time (firing time) for selected pairs of the low thrust thrusters 24. Environmental and other disturbance torques, such as solar torque, magnetic torques, gravitational torques, and torques resulting from spacecraft-based actuators, may be removed directly by the firings of the low thrust thrusters 24. This control law is also used with the high thrust thrusters 22 during orbit raising for attitude control. Upon a transition from the use of the high thrust thrusters 22 to the low thrust thrusters 24, the controller gains are switched from high gains to low gains.

One suitable and presently preferred quaternion control method is disclosed in copending U.S. patent application Ser. No. 08/934,981, filed Sep. 22, 1997, which claims priority from Provisional Patent Application No.: 60/028,161, filed 10/16/96, entitled "Method to Reorient a Spacecraft Using Only Initial Single Axis Attitude Knowledge", by J. D. Stoen and K. Chan. The control method is not, however, limited to this one technique and, in general, any of a number of conventional techniques for determining an attitude correction and required thruster firing on and off times can be used by the LTTACS 10.

Precise attitude pointing is maintained to within a specified attitude deadband, typically much less than 0.01 degrees about all axes, by selectively firing the low thrust thrusters 24.

Figure 2A:
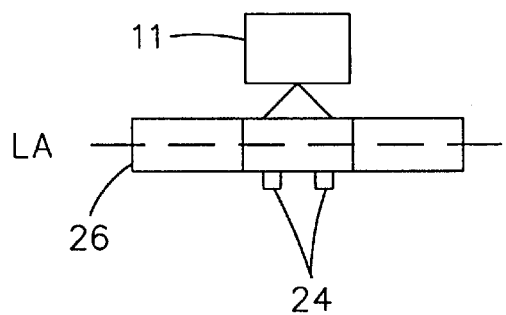
FIGS. 2A, 2B, 2C and 2D illustrate embodiments of spacecraft having low thrust thrusters for attitude control in accordance with an aspect of this invention.
Figure 2B:
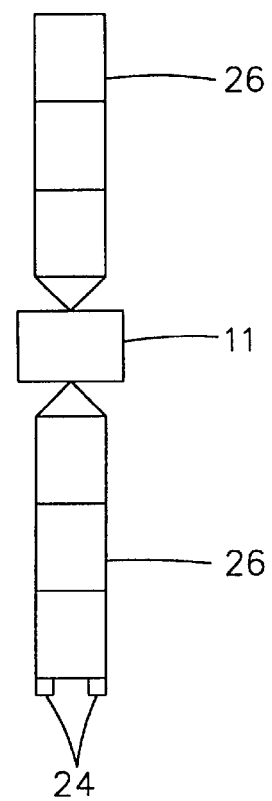
Figure 2C:
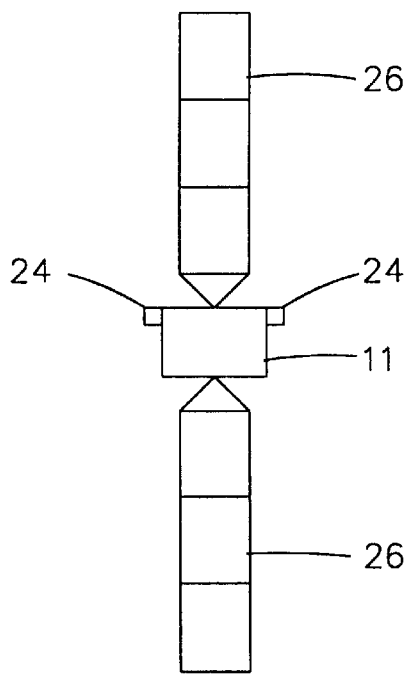
Figure 2D:
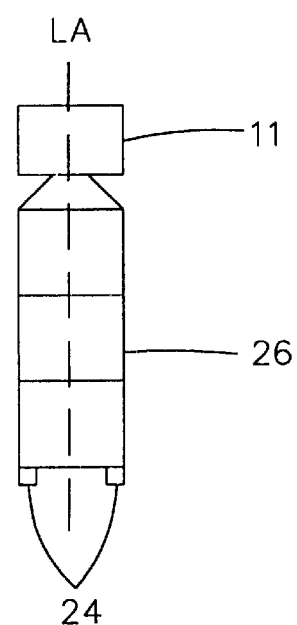

The conventional high thrust thrusters 22 are mounted on the main spacecraft body or bus 11. The low thrust thrusters 24, which are preferably lightweight and compact (having integrated propellant and hardware), can be mounted on the main spacecraft bus (as shown in FIG. 2C, or on any suitable appendages. As shown in FIGS. 2A, 2B, and 2D the low thrust thrusters 24 may be mounted, for example, at the periphery of one or more of the solar array panels 26.

For meteorological satellites having imaging hardware, by example, precise attitude knowledge provided by the attitude determination and control system 20 can be further corrected by the feed forwarding of satellite pointing error corrections to high bandwidth, 2-axis gimballed instrument payloads.

In a presently preferred, but not limiting embodiment, a spacecraft has four low thrust thrusters 24 to accomplish the following three goals.

(1) A first goal is to maintain high precision on-orbit attitude pointing with the low thrust thrusters 24, rather than with the (optional) momentum wheels 27.

(2) A second goal is to remove solar or other environmental disturbance torques with the low thrust thrusters 24, rather than using passive means, such as solar sails, or active means such as trim tabs and magnetic torquers.

(3) A third goal is to remove spacecraft momentum with the low thrust thrusters 24, rather than storing the momentum in momentum wheels.

The use of this technique has a number of advantages over the known prior art. These advantages include the following.

(1) A net savings in mass is realized by the removal of one or more of the trim tab, solar sail, momentum wheels, and magnetic torquers.

(2) A simplified spacecraft configuration design is realized since solar torque balancing is no longer a critical design parameter.

(3) A set of low thrust thrusters 24 (four low thrust thrusters in a presently preferred embodiment) is deployed in a configuration that enables both attitude control and the opposition of solar torque imbalance. A redundant set of four low thrust thrusters may also be provided.

(4) The low thrust thrusters 24 can be mounted on the solar array 26, or some other suitable spacecraft appendage, to maximize torque removal capability by increasing the moment arm about which the low thrust thrusters operate.

FIGS. 2A–2D illustrate spacecraft configuration designs that can remove the need for the above-described conventional trim tabs, symmetrically balanced solar arrays, solar sails, magnetic torquers and/or momentum wheels. FIGS. 2A, 2B, and 2D were discussed above. Note, for example, in FIGS. 2A and 2D that an asymmetric spacecraft bus, solar array panel configuration is used. In FIG. 2A a longitudinal axis (LA) of the solar array panels 26 does not pass through the bus 11, while in FIG. 2D the longitudinal axis (LA) does pass through the spacecraft bus 11. FIG. 2C shows the low thrust thrusters 24 located on the spacecraft bus 11.

FIGS. 3A and 3B shows a first low thrust thruster configuration that produces the required torques to control a wide range of environmental disturbance torques, such as solar torque, magnetic torques, gravitational torques and disturbance torques from spacecraft-based actuators. FIG. 3A is a view looking end-on at the solar array 26 of FIG. 2A, while FIG. 3B is a top view of the solar array 26.

Two redundant sets of four low thrust thrusters 26 are mounted at, preferably, the end of the solar array 26. The total of eight thrusters are referred to as 1–8. The design parameters are the lengths L1 and L2, referenced to the center of mass (cm), and the thrust angles α and β, as shown in FIGS. 3A and 3B. Thrusters 1, 2, 3 and 4 form a first low thrust thruster set, while thrusters 5, 6, 7, and 8 form a second (redundant) low thrust thruster set. A given four thruster configuration provides an efficient means of generating inertial torque for the removal of environmental torque disturbances acting on the spacecraft with a minimum thruster set. Both positive and negative torques about each axis can be generated by engaging a pair of low thrust thrusters 24 having thrust vectors disposed at the angles α and β. Table 1 illustrates the net torque polarities that can be generated by engaging various low thrust thruster pairs.

TABLE 1

| Thruster Pair | 1&3 | 2&4 | 1&4 | 2&3 | 1&2 | 3&4 |
|---|---|---|---|---|---|---|
| Torque | +Txi | −Txi | +Tyi | −Tyi | +Tzi | −Tzi |

This torque actuator capability can also be created with the redundant low thrust thrusters 5, 6, 7 and 8 of the second set.

The four low thrust thruster configuration and thruster pairing provides an efficient, low-mass technique to remove environmental disturbance torques. As an example, present low thrust thruster technology can provide force in the 0.0004 Nm range. The thruster configuration shown in this embodiment (with the large moment arms for increased efficiency) can thus provide torque capability in the range of 0.0012 Nm. This provides more than adequate control capability to remove expected environmental disturbance torques. Even for the case of a highly imbalanced spacecraft configuration, such as presented in FIGS. 3A and 3B, a factor of ten torque margin exists for solar torque mitigation and control.

The four low thrust thruster configuration and thruster pairing also provides a technique by which an on-orbit attitude control system can simultaneously maintain fine attitude pointing. As an example, for a spacecraft with 2400 Kg-m$^2$ inertia, the body rate generated by a single thruster pulse is 0.5 μrad/sec. Fine attitude pointing to within a desired deadband can be maintained with the above-referenced attitude determination and control system 20 that commands actuation of the low thrust thruster pairs designated in Table 1. For the embodiment presented here, maintaining an exemplary ±25 μrad (0.0014 deg) roll attitude pointing deadband entails pulsing thruster pairs 1& 3 (for +Txi) or 2& 4 (for −Txi) an average of once every 100 seconds.

Figure 4A:
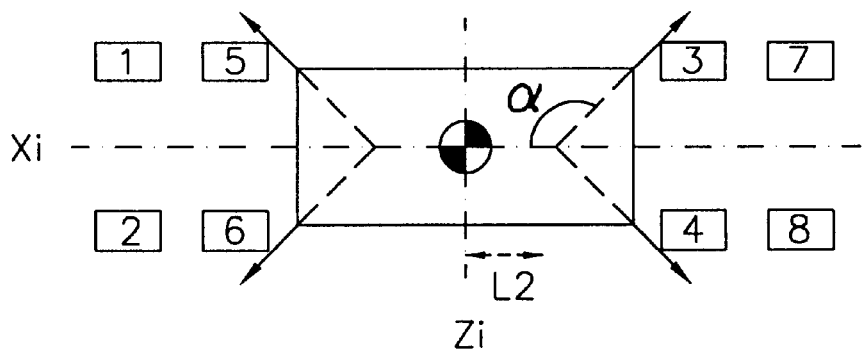
FIGS. 4A and 4B illustrate a second low thrust thruster configuration in accordance with this invention.
Figure 4B:
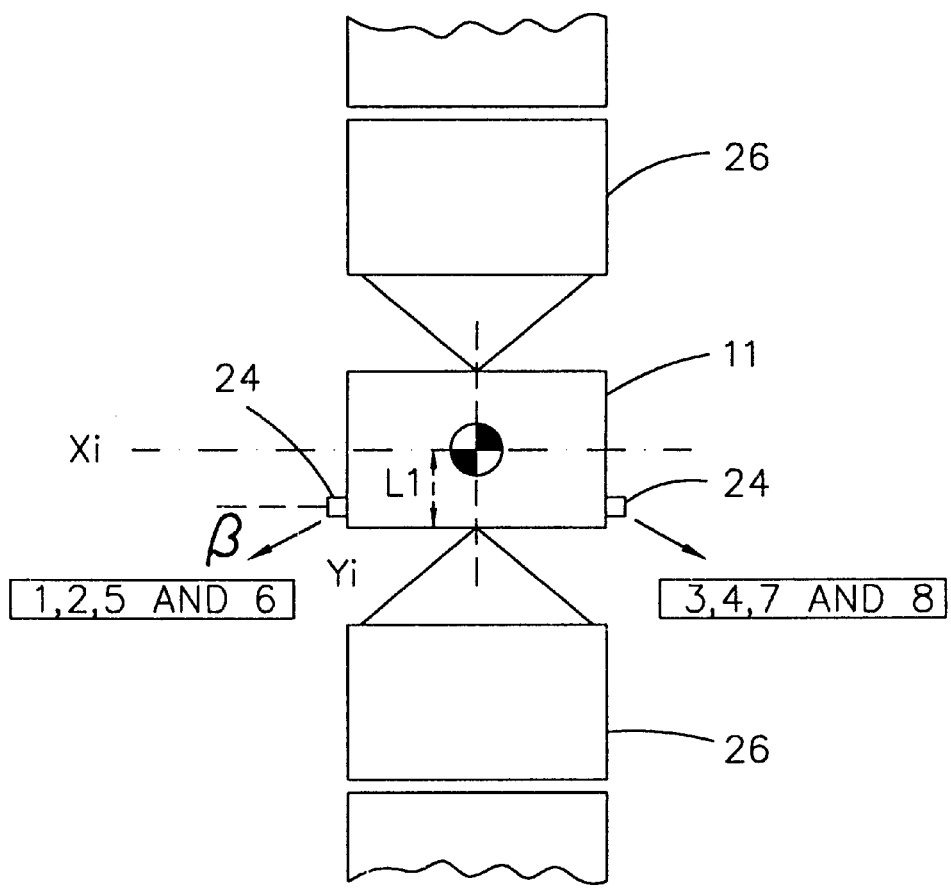

A second low thrust thruster embodiment is illustrated in FIGS. 4A and 4B. In this embodiment two redundant sets of low thrust thrusters 24 are mounted near the corners of the spacecraft bus 11. Thrusters 1, 2, 3 and 4 form a first set, while thrusters 5, 6, 7, and 8 form a second, redundant set. This thruster configuration provides an efficient mean of generating body torque for removal of environmental torque disturbances acting on the spacecraft with a minimum thruster set. Both positive and negative torques about each axis can be generated by engaging a pair of thrusters. Table 2 illustrates the net torque polarities that can be generated by engaging a thruster pair.

TABLE 2

| Thruster Pair | 1&3 | 2&4 | 1&4 | 2&3 | 1&2 | 3&4 |
|---|---|---|---|---|---|---|
| Torque | +Txb | −Txb | +Tyb | −Tyb | +Tzb | −Tzb |

These four thruster configuration and pairing arrangements thus provide a means to obtain fine pointing attitude control, and the capability to remove environmental disturbance torques with a minimum thruster set configuration.

The use of low thrust thrusters 24, such as pulse plasma thrusters, is especially beneficial as these units are typically electrically powered, and do not require fuel tanks, fuel lines, and other support equipment. This enables the placement of the low thrust thrusters 24 at locations on the spacecraft, such as the periphery of the solar array panel(s) 26, that would be difficult to achieve with conventionally fueled thrusters.

Having described the overall context of this invention, a description will now be made of presently preferred embodiments of this invention.

The teachings of this invention are particularly useful with, but are not limited to, the above disclosed Low Thrust Thruster Attitude Control System (LTTACS). In more detail, the teachings of this invention are useful with the embodiments of FIGS. 2A, 2B and 2D, wherein the low thrust thrusters 24 are located on the solar array panels 26 (or on any other spacecraft appendage that would be susceptible to mechanical oscillations due to the thruster firings).

The use of the teaching of this invention significantly reduces the solar array panel excitations induced by the firing of the low thrust thrusters 24 for momentum dumping or attitude correction. This is particularly useful in a high precision pointing spacecraft application that has large, flexible solar arrays or other flexible structures, and where the low thrust thrusters 24 are employed in momentum management and/or attitude control.

The use of this invention does not require additional hardware, such as active or passive dampers, that are required to suppress excitation of the primary flexible solar array mode.

The use of this invention provides increased capability to compensate for parameter uncertainty, as well as daily and seasonal changes of the primary modal frequency of the structure on which the thrusters are mounted. This is made possible because an interval between a pair of low thrust thruster firings can be adjusted via command to a spacecraft on-board processor, such as the processor 20 of FIG. 1.

In accordance with an aspect of this invention the low thrust thruster firings that are used for momentum dumping and/or attitude control are used simultaneously to suppress structural excitation. This is accomplished by partitioning the firing into two parts separated by a predetermined period of time, the duration of the predetermined period of time being a function of the primary modal frequency of the structure that supports the low thrust thrusters 24.

As was described above, conventional approaches to reducing spacecraft structural excitations include adding active or passive damping devices and/or providing stiffening members to the spacecraft structural members. However, this approach increases the spacecraft mass and also non-recurring costs. Furthermore, and if additional hardware damping devices are used, the devices are typically custom designed for a particular application, and are tuned to a single pre-flight modal frequency. However, variations in the primary modal frequency may occur during the operational life of the spacecraft.

The technique in accordance with this invention has no such restrictions, since the deadbeat frequency for a thruster firing pair can be tuned on-orbit, and can accommodate a wide (and possibly varying) range of modal frequencies.

This invention provides a low cost and simple solution, relative to the prior art, since a variable Δt (i.e., the time between firings of a thruster pulse pair), is implemented in software in the on-board processor.

Referring again to FIGS. 2A, 2B and 2D, the low thrust thrusters 24 are mounted on the end of the flexible solar array panel 26. Upon the firing of the low thrust thruster pair for momentum dumping or attitude control, the flexible body of the solar array panel 16 will be excited. After repeated firings, without taking special precautions, the structural excitation can increase or decrease in magnitude, and is a function of the phasing of thruster firings with respect to the structural frequencies (see FIGS. 6A and 6B). The end result is the introduction of jitter on the central body (i.e., the spacecraft bus 11 ). Such jitter is particularly undesirable when the spacecraft carries an imaging payload, or any payload whose operation would be adversely affected by the jitter.

In accordance with the teaching of this invention, the method to suppress the structural excitation, and in particular the dominant structural modes, is accomplished by a proper selection of the time $\Delta t$ between pairs of thruster firing(s). A low thrust thruster firing pair is defined nominally as a single firing that is divided or partitioned into two parts. The deadbeat period $\Delta t$ between the two firings of the thruster pair is determined by:

$$\Delta t = (½) \times (1/F) \times SF,$$

where $\Delta t$ is the time between a pair of thruster firings (seconds), F is the dominant modal frequency, in Hertz, for any particular axis (nominally the 1st mode), and SF is a scale factor that can be adjusted about the frequency.

Thus, any solar array panel oscillations induced by a first low thrust thruster firing is cancelled (nominally) one half period later by the second firing.

Figure 6A:
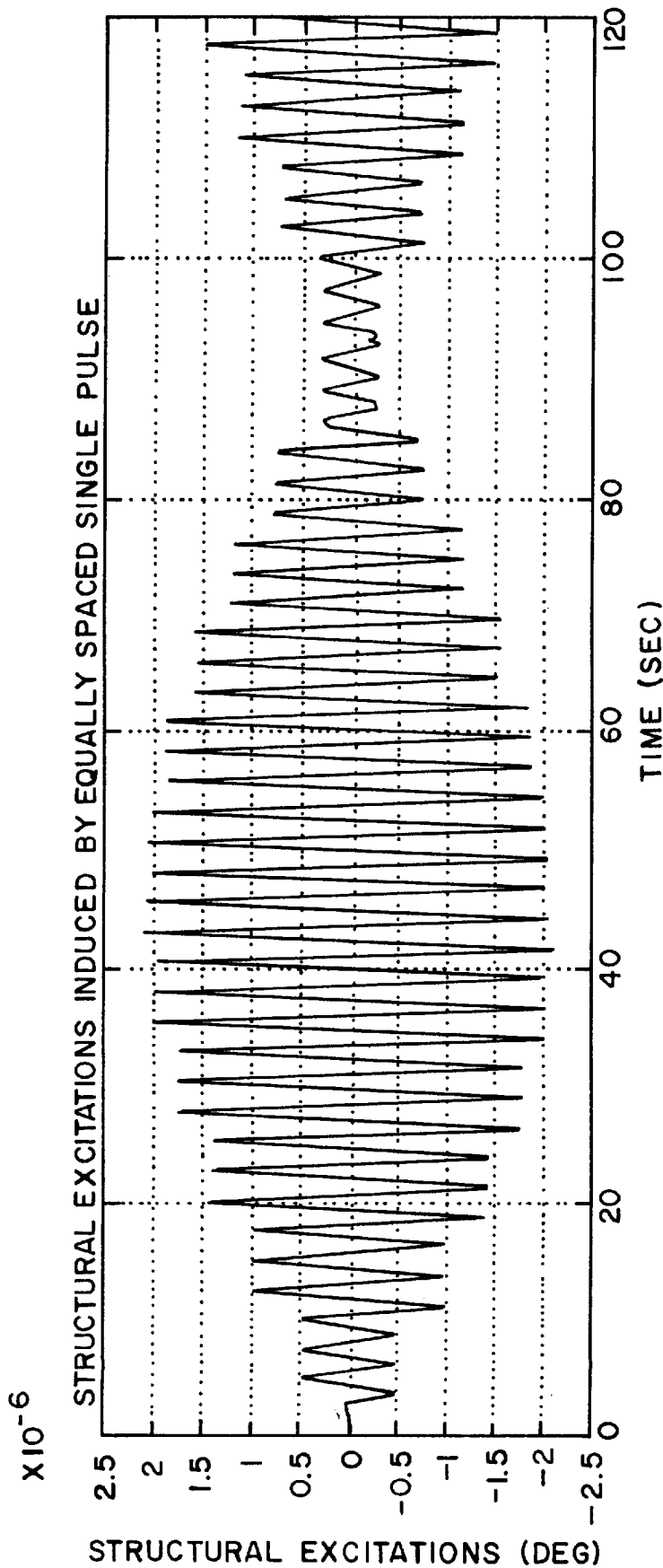
FIGS. 6A and 6B illustrate exemplary solar array panel structural excitations and thruster firing pulses, respectively, plotted as a function of time without using the teaching of this invention.
Figure 6B:
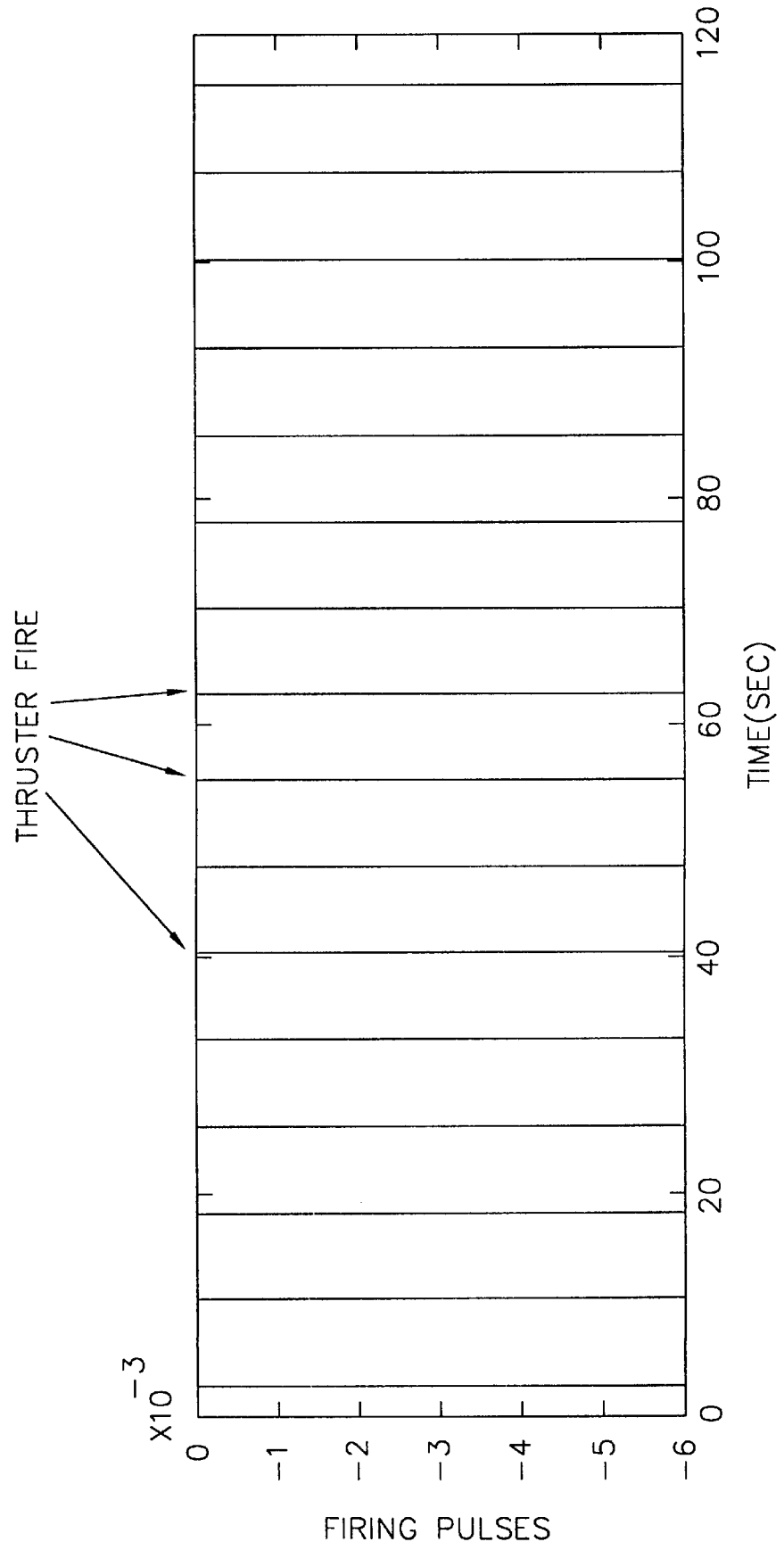

FIGS. 6A and 6B illustrate a simulated example of a structural excitation caused by single low thrust thruster firings. As can be seen, the amplitude of the first oscillation mode gradually increases and then decreases.

Figure 7A:
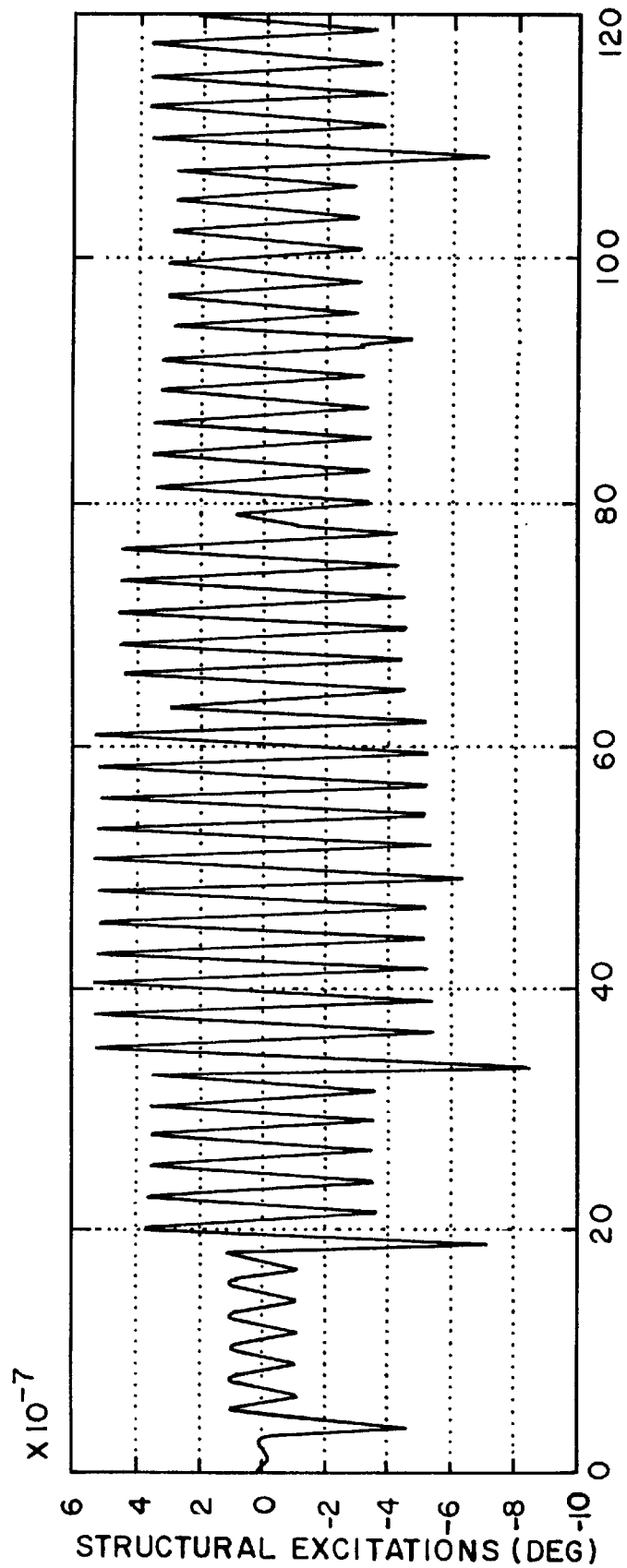
FIGS. 7A and 7B illustrate exemplary solar array panel structural excitations and thruster firing pulses, respectively, plotted as a function of time using the teaching of this invention, wherein the thruster firings are offset in time from one another.
Figure 7B:
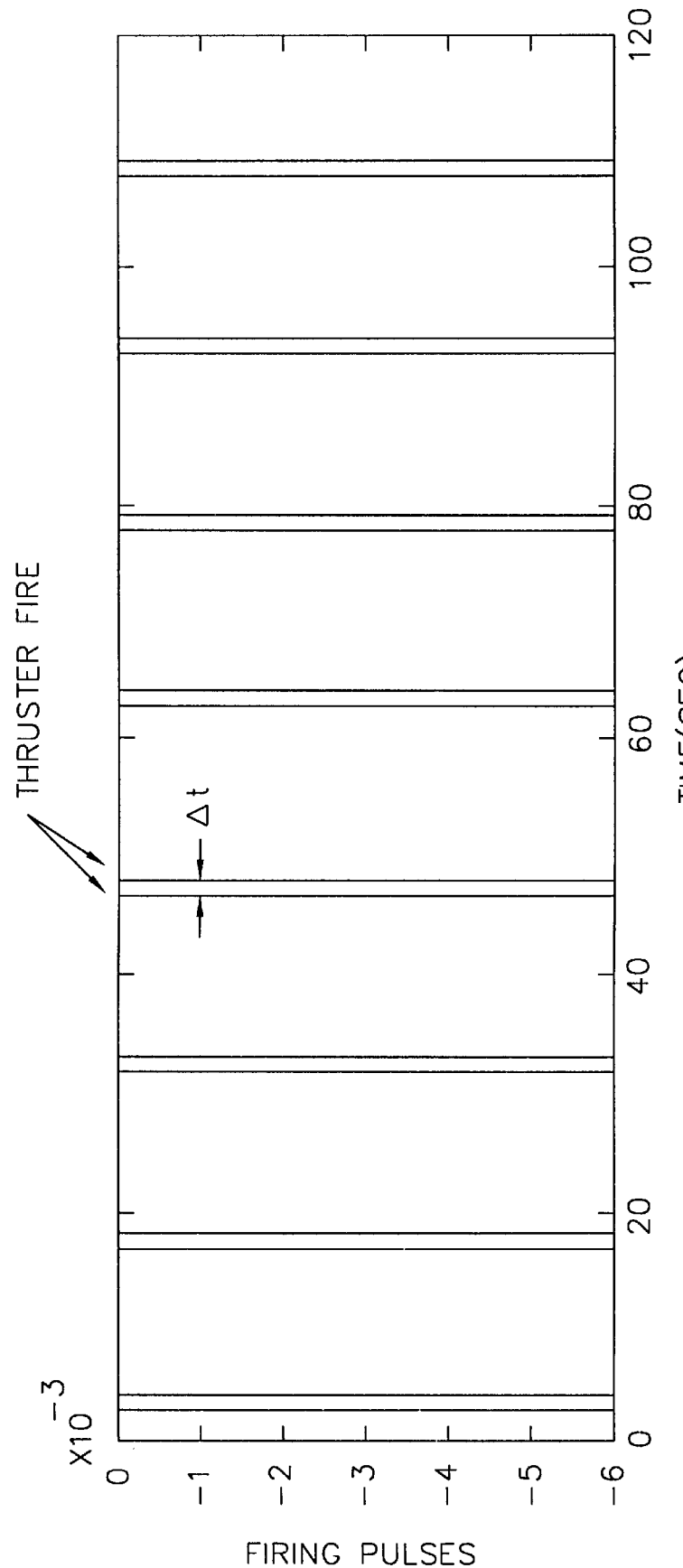

FIGS. 7A and 7B illustrate a significant reduction in the structural excitation when the firing of the low thrust thruster pair is partitioned into two firings that are spaced apart by $\Delta t$, as determined by the expression shown above. Note that the vertical axis in FIG. 6A is $10^{-6}$ degrees, whereas the vertical axis of the improvement shown in FIG. 7A is $10^{-7}$ degrees.

Although described in the context of the firing of pairs of the low thrust thrusters 24, as described above with respect to FIGS. 3A, 3B, 4 A and 4B, it is within the scope of the teaching of this invention to employ but a single thruster, such as one located on an axis that passes through the center of mass of the spacecraft.

For the presently preferred pulse plasma thrusters, a firing sequence is initiated by a command to charge a thruster capacitor (e.g., 32 V at 1 amp for 1 second produces 400 $\mu$N of thrust), followed by the actual command to fire the thruster (the actual firing occurs in microseconds). When partitioning the thruster firing in accordance with this invention a required charge time can be reduced for each of the two firings, or the charge time can be maintained at the original level and the thrusters 24 fired less frequently, so as to obtain the desired amount of torque. It is generally preferable, for efficiency reasons, to fully charge the capacitor before each firing. The teaching of this invention is, however, not limited for use only with pulse plasma thrusters.

The scale factor SF can be adjusted, such as by commands sent to the spacecraft over a telemetry link, to optimize the value of $\Delta t$ to compensate for any variations that may occur in the structural excitation characteristics over time.

While the invention has been particularly shown and described with respect to preferred embodiments thereof, it will be understood by those skilled in the art that changes in form and details may be made therein without departing from the scope and spirit of the invention.

What is claimed is:

1. A spacecraft comprising a plurality of low thrust thrusters mounted at predetermined locations on a spacecraft structure, said plurality of low thrust thrusters being fired in pairs for generating a desired torque, where the firing of a low thrust thruster pair is partitioned into two firings that are offset in time by an amount $\Delta t$, wherein $$\Delta t = (½) \times (1/F) \times SF,$$

where F is a dominant modal frequency, in Hertz, for any particular axis (nominally the 1st mode) of the spacecraft structure, and where SF is a scale factor that is adjustable about the frequency.

2. A spacecraft as in claim 1, wherein said low thrust thrusters are mounted on a solar array panel.

3. A geosynchronous spacecraft comprising a first set of four low thrust thrusters and a second set of four, redundant, low thrust thrusters, said first and second sets of low thrust thrusters being mounted in a predetermined configuration on a spacecraft structure, said plurality of low thrust thrusters being fired in pairs for generating a desired torque, where the firing of a low thrust thruster pair is partitioned into two firings that are offset in time by an amount $\Delta t$, wherein $$\Delta t = (½) \times (1/F) \times SF,$$

where F is a dominant modal frequency, in Hertz, for any particular axis (nominally the 1st mode) of the spacecraft structure, and where SF is a scale factor that is adjustable about the frequency.

4. A spacecraft as in claim 3, wherein said low thrust thrusters are mounted adjacent to an end of a solar array panel.

5. A spacecraft as in claim 4, wherein a longitudinal axis of said solar array panel passes through said spacecraft bus.

6. A spacecraft comprising a plurality of thrusters mounted at predetermined locations on a spacecraft structure, individual ones said plurality of thrusters being fired for generating a torque about a desired axis, where the firing of a thruster is partitioned into two firings that are offset in time by an amount $\Delta t$, wherein $$\Delta t = (½) \times (1/F) \times SF,$$

where F is a dominant modal frequency, in Hertz, for any particular axis (nominally the 1st mode) of the spacecraft structure, and where SF is a scale factor that is adjustable about the frequency.

7. A spacecraft as in claim 6, wherein said thruster is a low thrust thruster that is mounted on an end of a solar array panel.

8. A method for operating a spacecraft, comprising steps of:

providing a plurality of low thrust thrusters mounted at predetermined locations on a spacecraft structure;

controllably firing said plurality of low thrust thrusters in pairs for generating a desired torque; and partitioning the firing of a low thrust thruster pair into two firings that are offset in time by an amount $\Delta t$, wherein $$\Delta t = (½) \times (1/F) \times SF,$$

where F is a dominant modal frequency, in Hertz, for any particular axis (nominally the 1st mode) of the spacecraft structure, and where SF is a scale factor that is adjustable about the frequency.

9. A method as in claim 8, wherein said low thrust thrusters are mounted on a solar array panel.

* * * * *